(12) United States Patent
Qiu

(10) Patent No.: US 11,350,674 B2
(45) Date of Patent: Jun. 7, 2022

(54) ELECTRONIC CIGARETTE AND METHOD FOR ADJUSTING POWER THEREOF

(71) Applicants: JOYETECH EUROPE HOLDING GMBH, Zug (CH); CHANGZHOU JWEI INTELLIGENT TECHNOLOGY CO., LTD., Jiangsu (CN)

(72) Inventor: Weihua Qiu, Changzhou (CN)

(73) Assignee: JOYETECH EUROPE HOLDING GMBH, Zug (CH)

(*) Notice: Subject to any disclaimer, the term of this patent is extended or adjusted under 35 U.S.C. 154(b) by 202 days.

(21) Appl. No.: 16/641,228

(22) PCT Filed: Aug. 3, 2018

(86) PCT No.: PCT/CN2018/098449
§ 371 (c)(1),
(2) Date: Feb. 21, 2020

(87) PCT Pub. No.: WO2019/037583
PCT Pub. Date: Feb. 28, 2019

(65) Prior Publication Data
US 2020/0214358 A1 Jul. 9, 2020

(30) Foreign Application Priority Data
Aug. 21, 2017 (CN) .......................... 201710721337.5

(51) Int. Cl.
A24F 13/00 (2006.01)
A24F 40/53 (2020.01)
(Continued)

(52) U.S. Cl.
CPC .............. *A24F 40/53* (2020.01); *A24F 40/60* (2020.01); *A24F 40/90* (2020.01); *A24F 40/10* (2020.01); *A24F 40/51* (2020.01)

(58) Field of Classification Search
CPC ....................................... A24F 47/00
(Continued)

(56) References Cited

U.S. PATENT DOCUMENTS 11,019,846 B2 * 6/2021 Ding ........................ A24F 40/42
11,051,550 B2 * 7/2021 Lin ........................... A24F 40/42
(Continued)

FOREIGN PATENT DOCUMENTS

CN 203058292 U 7/2013
CN 203058294 U 7/2013
(Continued)

Primary Examiner — Phuong K Dinh
(74) Attorney, Agent, or Firm — Cheng-Ju Chiang

(57) ABSTRACT

An electronic cigarette and a method for adjusting the power thereof are provided. The electronic cigarette includes an atomizer and a battery device. The battery device includes a casing, and a controller and a power output module disposed inside the casing. The atomizer is detachably connected to the battery device. The casing is provided with an indication module. The controller is electrically connected to the indication module and the power output module, separately. The controller controls the indication module to alternately issue different indication signals. When the controller detects that the atomizer is connected to the battery device, the controller determines the target output power corresponding to the indication signal currently issued by the indication module according to the pre-stored correspondences between the indication signals and the output powers. When a suction signal is detected, the controller controls the power output module to output the target output power.

14 Claims, 3 Drawing Sheets

(51) Int. Cl.
    *A24F 40/90* (2020.01)
    *A24F 40/60* (2020.01)
    *A24F 40/51* (2020.01)
    *A24F 40/10* (2020.01)

(58) Field of Classification Search
    USPC .................................................. 131/328–329
    See application file for complete search history.

(56) References Cited

U.S. PATENT DOCUMENTS

| | | |
|---|---|---|
| 2014/0053856 A1 | 2/2014 | Liu |
| 2016/0366946 A1 | 12/2016 | Murison et al. |

FOREIGN PATENT DOCUMENTS

| | | |
|---|---|---|
| CN | 104049550 A | 9/2014 |
| CN | 203872998 U | 10/2014 |
| CN | 104432537 A | 3/2015 |
| CN | 105212280 A | 1/2016 |
| CN | 106037007 A | 10/2016 |
| CN | 106579563 A | 4/2017 |
| WO | 2016/175320 A1 | 11/2016 |

* cited by examiner

ELECTRONIC CIGARETTE AND METHOD FOR ADJUSTING POWER THEREOF

CROSS REFERENCE TO RELATED APPLICATIONS

This application is a 35 U.S.C. § 371 National Phase conversion of International (PCT) Patent Application No. PCT/CN2018/098449, filed on Aug. 3, 2018, which is based on and claims priority of Chinese patent application No. 201710721337.5, filed on Aug. 21, 2017. The entire disclosure of the above-identified applications is incorporated herein by reference. The PCT International Patent Application was filed and published in Chinese.

TECHNICAL FIELD

The present disclosure relates to the technical field of electronic cigarettes, and in particular, to an electronic cigarette and a method for adjusting the power of the electronic cigarette.

BACKGROUND

An electronic cigarette is an electronic product that imitates a cigarette. It is generally composed of an atomizer and a battery device. The atomizer is used as the atomizing device of the electronic cigarette and can generate smoke when it is energized. The battery device is used as the power supply device of the electronic cigarette and provides the working voltage to the atomizer.

The battery device is usually provided with a plurality of buttons for adjusting the power provided by the battery device to the atomizer. However, in order to achieve miniaturization and simplicity, the electronic cigarettes of automatic small-sized type are generally not provided with such buttons.

In implementing this disclosure, the inventors found that at least the following problems exist:

Automatic small-sized electronic cigarettes are not provided with buttons, which results in a single and fixed output power, and such electronic cigarettes cannot meet the diverse needs of users.

SUMMARY

In order to overcome the problem that the electronic cigarette in the related art has a single and fixed working power, and the user cannot autonomously select the working power of the electronic cigarette, the present disclosure provides an electronic cigarette and a method for adjusting the power of the electronic cigarette. The technical solution is as follows:

According to a first aspect of the embodiment of the present disclosure, an electronic cigarette is provided. The electronic cigarette includes an atomizer and a battery device. The battery device includes a casing, and a controller and a power output module disposed inside the casing, wherein:

the atomizer is detachably connected to the battery device;

the casing is provided with an indication module;

the controller is electrically connected to the indication module and the power output module, respectively;

the controller is configured to control the indication module to alternately issue different indication signals;

when the controller detects that the atomizer is connected to the battery device, the controller is configured to determine the target output power corresponding to the indication signal currently issued by the indication module according to the pre-stored correspondences between the indication signals and the output powers, and control the power output module to output the target output power when a suction signal is detected.

Optionally, the battery device further includes a battery; the battery is electrically connected to the controller, the indication module and the power output module, respectively;

the controller is further configured to:

detect the current electric quantity of the battery;

determine a first indication signal corresponding to an electric quantity range of the current electric quantity of the battery according to the pre-stored correspondences between the indication signals and the electric quantity ranges of the battery; and control the indication module to issue the first indication signal.

Optionally, the battery device further includes a battery; the battery is electrically connected to the controller, the indication module and the power output module, respectively;

the controller is further configured to:

detect the current electric quantity of the battery when the atomizer is separated from the battery device;

determine the output power set corresponding to the electric quantity range of the current electric quantity according to the pre-stored correspondences between the electric quantity ranges and the output powers;

determine an indication signal set according to the correspondences between the indication signals and the output powers and according to the output power set corresponding to the electric quantity range of the current electric quantity; and control the indication module to alternately issue the indication signals contained in the determined indication signal set, wherein the output power set contains at least one output power, the indication signal set contains at least one indication signal.

Optionally, a humidity sensor for detecting e-liquid is provided in a liquid storage chamber of the atomizer;

when the atomizer and the battery device are in a connected state, the humidity sensor is electrically connected to the controller;

the humidity sensor is configured to periodically send a humidity value to the controller when the atomizer and the battery device are in a connected state;

the controller is further configured to:

determine the relationship between the humidity value received in the last period before the atomizer is separated from the battery device and a preset humidity threshold when the controller detects that the atomizer is separated from the battery device; and control the indication module to alternately issue different indication signals if the humidity value is greater than the preset humidity threshold.

Optionally, when a shaking signal is firstly detected and then the controller detects that the atomizer is separated from the battery device, the controller is configured to control the indication module to alternately issue different indication signals.

Optionally, when the atomizer and the battery device are in a connected state, if a shaking signal is detected, the controller is configured to:

determine the current output power of the power output module;

determine a second indication signal corresponding to the current output power of the power output module according to the correspondences between the indication signals and the output powers; and control the indication module to issue the second indication signal.

According to a second aspect of the embodiment of the present disclosure, a method being applied to an electronic cigarette for adjusting the power of the electronic cigarette is provided. The electronic cigarette includes an atomizer and a battery device. The battery device includes a casing, and a controller and a power output module disposed inside the casing. The atomizer is detachably connected to the battery device. The casing is provided with an indication module. The controller is electrically connected to the indication module and the power output module, respectively, wherein the method includes:

when the controller detects that the atomizer is separated from the battery device, the controller controls the indication module to alternately issue different indication signals;

when the controller detects that the atomizer is connected to the battery device, the controller determines the target output power corresponding to the indication signal currently issued by the indication module according to the pre-stored correspondences between the indication signals and the output powers;

when a suction signal is detected, the controller controls the power output module to output the target output power.

Optionally, the battery device further includes a battery. The battery is electrically connected to the controller, the indication module and the power output module, respectively. The method further includes:

the controller detects the current electric quantity of the battery;

the controller determines a first indication signal corresponding to an electric quantity range of the current electric quantity of the battery according to the pre-stored correspondences between the indication signals and the electric quantity ranges of the battery; and the controller controls the indication module to issue the first indication signal.

Optionally, the battery device further includes a battery. The battery is electrically connected to the controller, the indication module and the power output module, respectively, wherein:

the step that when the controller detects that the atomizer is separated from the battery device, the controller controls the indication module to alternately issue different indication signals, includes:

the controller detects the current electric quantity of the battery when the atomizer is separated from the battery device;

the controller determines the output power set corresponding to the electric quantity range of the current electric quantity according to the pre-stored correspondences between the electric quantity ranges and the output powers, wherein the output power set contains at least one output power;

the controller determines an indication signal set according to the correspondences between the indication signals and the output powers and according to the output power set corresponding to the electric quantity range of the current electric quantity, wherein the indication signal set contains at least one indication signal; and the controller controls the indication module to alternately issue the indication signals contained in the determined indication signal set.

Optionally, a humidity sensor for detecting e-liquid is provided in a liquid storage chamber of the atomizer; when the atomizer and the battery device are in a connected state, the humidity sensor is electrically connected to the controller and periodically sends a humidity value to the controller; wherein:

the step that when the controller detects that the atomizer is separated from the battery device, the controller controls the indication module to alternately issue different indication signals, includes:

the controller determines the relationship between the humidity value received in the last period before the atomizer is separated from the battery device and a preset humidity threshold when the controller detects that the atomizer is separated from the battery device; and the controller controls the indication module to alternately issue different indication signals if the humidity value is greater than the preset humidity threshold.

Optionally, the step that when the controller detects that the atomizer is separated from the battery device, the controller controls the indication module to alternately issue different indication signals, includes:

when a shaking signal is firstly detected and then the controller detects that the atomizer is separated from the battery device, the controller controls the indication module to alternately issue different indication signals.

Optionally, the method further includes:

when the atomizer and the battery device are in a connected state, if a shaking signal is detected, the controller determines the current output power of the power output module, determines a second indication signal corresponding to the current output power of the power output module according to the correspondences between the indication signals and the output powers, and controls the indication module to issue the second indication signal.

According to a third aspect of the embodiment of the present disclosure, a device for adjusting the power of an electronic cigarette is provided. The device for adjusting the power of the electronic cigarette includes:

a memory and a processor;

wherein the memory stores therein at least one instruction; and the processor, by loading and executing the at least one instruction, implements the above method for adjusting the power of the electronic cigarette.

According to a fourth aspect of the embodiment of the present disclosure, a computer-readable storage medium is provided. The computer-readable storage medium stores therein one or more instructions, when the one or more instructions are executed by a processor in an electronic cigarette, the above method for adjusting the power of the electronic cigarette is implemented.

The technical solutions provided by the embodiments of the present disclosure may include the following technical effects:

In the embodiment of the present disclosure, when the user uses the above-mentioned electronic cigarette and intends to adjust its output power, firstly, the user separates the atomizer from the battery device; then, when an indication signal corresponding to a certain power is issued, the user connects the atomizer to the battery device, so that the electronic cigarette will be working at this power. Therefore, the electronic cigarette can realize switching of output power through the separation and connection between the atomizer and the battery device, without the need to set a button. Thus, on the basis of meeting the miniaturization requirement, the electronic cigarette can output a variety of powers, and the user can select the output power of the electronic cigarette autonomously.

It is understood that the above general description and the following detailed description are merely exemplary and explanatory, and should not limit the present disclosure.

BRIEF DESCRIPTION OF THE DRAWINGS

The drawings herein are incorporated in and constitute a part of this specification, illustrate embodiments consistent with the present disclosure, and together with the description serve to explain the principles of the present disclosure. In the drawings.

Figure 1:
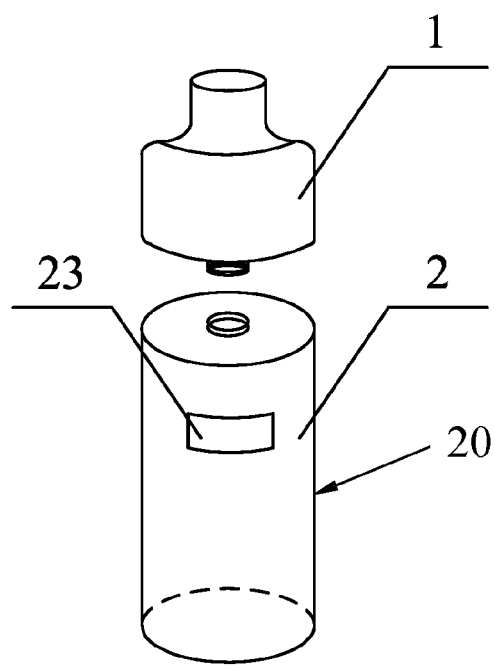
FIG. 1 is a schematic structural diagram of an electronic cigarette according to an embodiment.

Reference numerals of the components are as follows.

| | |
|---|---|
| atomizer 1 | battery device 2 |
| liquid storage chamber 11 | controller 21 |
| power output module 22 | indication module 23 |
| battery 24 | acceleration sensor 25 |
| PCB board 26 | humidity sensor 111 |

Through the above drawings, a clear embodiment of the present disclosure has been shown, which will be described in more detail later. These drawings and text descriptions are not intended to limit the scope of the concept of the present disclosure in any way, but rather to explain the concepts of the present disclosure to those skilled in the art by reference to specific embodiments.

DETAILED DESCRIPTION OF PREFERRED EMBODIMENTS

Exemplary embodiments will be described in detail here, examples of which are illustrated in the accompanying drawings. When the following description refers to the accompanying drawings, the same numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure, as detailed in the appended claims.

First Embodiment

Figure 2:
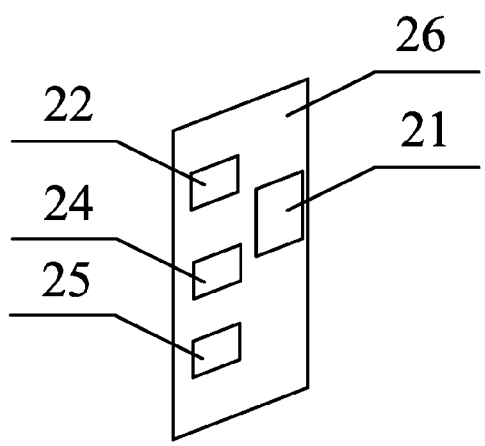
FIG. 2 is a schematic structural diagram of a PCB board according to an embodiment.

An exemplary embodiment of the present disclosure provides an electronic cigarette. As shown in FIG. 1, the electronic cigarette includes an atomizer 1 and a battery device 2. The battery device 2 includes a casing 20 and a PCB board (Printed Circuit Board) 26 disposed inside the casing 20. As shown in FIG. 2, the PCB board 26 further includes a controller 21 and a power output module 22. The atomizer 1 is detachably connected to the battery device 2. As shown in FIG. 1, the casing 20 is provided with an indication module 23 configured for issuing indication signals to remind the user to perform corresponding operations. The controller 21 is electrically connected to the indication module 23 and the power output module 22, respectively. The controller 21 is configured to control the indication module 23 to alternately issue different indication signals. When the controller 21 detects that the atomizer 1 is connected to the battery device 2, the controller 21 determines the target output power corresponding to the indication signal currently issued by the indication module 23 according to the pre-stored correspondences between the indication signals and the output powers, and controls the power output module 22 to output the target output power.

The atomizer 1 is a device capable of atomizing e-liquid to form smoke. The battery device 2 serves as a power supply device of the electronic cigarette and is used to provide a working voltage to the atomizer 1.

In the embodiment, the atomizer 1 and the battery device 2 are detachably connected by means of, for example, threads, locking or snaps. When the user smokes, the atomizer 1 is screwed/locked to the battery device 2. This detachable connection enables, when one of the devices cannot be used, the other device to be continued for use. For example, when the atomizer 1 is damaged or there is no e-liquid in the atomizer 1, another new atomizer can be replaced on the battery device 2, so that the user can continue to use the electronic cigarette. In the embodiment, the connection between the atomizer 1 and the battery device 2 is detachable, which is mainly used to adjust the output power of the battery device 2 to the atomizer 1, as will be described in detail below.

The indication module 23 provided on the casing 20 of the battery device 2 is mainly used to issue the indication signals to remind the user to perform corresponding operations. Specifically, the indication module 23 is electrically connected to the controller 21, and the controller 21 can control the indication module 23 to issue different indication signals. For example, the indication module 23 is a single indicating lamp, and the controller 21 controls the indicating lamp to emit lights of different colors, such as red, green, or yellow. As another example, the indication module 23 is three indicating lamps, and the controller 21 controls the number of the indicating lamps to be turned on, such as one of the indicating lamps being turned on, two of the indicating lamps being turned on, or three of the indicating lamps being turned on. For another example, the indication module 23 is three indicating lamps, and the controller 21 controls one of the indicating lamps to be turned on, such as the first indicating lamp being turned on, the second indicating lamp being turned on, or the third indicating lamp being turned on. The indication signals may be used to indicate the output power, or to indicate the electric quantity of the electronic cigarette.

The power output module 22 is mainly used for outputting power, and the output power is controlled by the controller 21. For example, by setting the power adjustment circuit of the battery device 2, the power output module 22 can be controlled by the controller 21 to output power of three values according to actual situations, such as 50 watts, 80 watts and 100 watts.

The principle that the controller 21 controls the power output module 22 to output power according to the indication signals of the indication module 23 can be as follows.

When the controller 21 detects that the atomizer 1 is separated from the battery device 2, the controller 21 controls the indication module 23 to alternately issue different indication signals. When the controller 21 detects that the atomizer 1 is connected to the battery device 2 again, the controller 21 detects the indication signal issued by the indication module 23 at the moment when the atomizer 1 is connected to the battery device 2, and then the controller 21 controls the power output module 22 to output a certain value of power according to the pre-stored correspondences between the indication signals and the output powers. The following illustrates this principle with specific examples.

For example, the indication module 23 is an indicating lamp capable of emitting lights of three colors: green, yellow, and red; the power output module 22 can output powers of 50 watts, 80 watts and 100 watts; and the correspondences between the colors of the emitted light of the indicating lamp and the output powers as shown in Table 1 is pre-stored in the storage module of the controller 21. When the user unscrews the atomizer 1 from the battery device 2, the controller 21 detects that the atomizer 1 is separated from the battery device 2, and then the controller 21 controls the indicating lamp to alternately emit light of three colors: green, yellow, and red. The time interval for emitting the three colors of light in a cycle is preset. When the user screws the atomizer 1 onto the battery device 2 again, the controller 21 detects the color of light emitted by the indicating lamp at the moment when the atomizer 1 is connected to the battery device 2, for example, if it is green light, then the controller 21 controls the power output module 22 to output an output power of 100 watts.

TABLE 1 the correspondences between the indication signals and the output powers

| indication signals (the colors of light emitted by the indicating lamp) | output powers |
|---|---|
| green | 100 W |
| yellow | 80 W |
| red | 50 W |

In view of above, the user may adjust the working power of the electronic cigarette as follows. Firstly, the user separates the atomizer from the battery device; then, when an indication signal corresponding to a certain power is issued by the indication module, the user connects the atomizer to the battery device so that the electronic cigarette can work at this power. For example, if the user intends the electronic cigarette to work at 100 watts, the user firstly separates the atomizer from the battery device; then, when the indication module emits green light, the user connects the atomizer to the battery device. In this way, the electronic cigarette will be working at 100 watts.

The above-mentioned electronic cigarette can realize switching of output power through the separation and connection between the atomizer and the battery device, without the need to set a button. Thus, on the basis of meeting the miniaturization requirement, the electronic cigarette can output a variety of powers, and the user can select the output power of the electronic cigarette autonomously.

Second Embodiment

Figure 3:
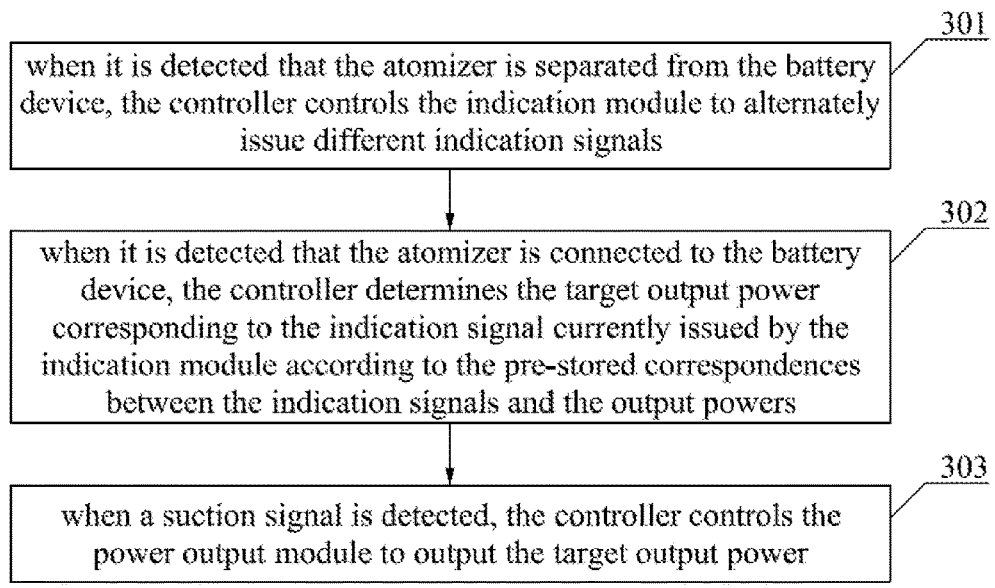
FIG. 3 is a flow chart showing a method for adjusting the power of an electronic cigarette according to an embodiment.

An exemplary embodiment of the present disclosure provides a method for adjusting the power of an electronic cigarette, which can be applied to the electronic cigarette described in the first embodiment. As shown in FIG. 3, the method may include the following steps:

In step 301, when the controller 21 detects that the atomizer 1 is separated from the battery device 2, the controller 21 controls the indication module 23 to alternately issue different indication signals.

As described in the first embodiment, the indication module 23 may issue different indication signals under the control of the controller 21, and each indication signal may represent an information for the controller 21 and the user to recognize.

In the embodiment, when the user intends to adjust the output power of the electronic cigarette, the atomizer 1 is separated from the battery device 2 by the user, and the circuit between the atomizer 1 and the battery device 2 is disconnected. After the controller 21 determines that the circuit is disconnected, the controller 21 controls the indication module 23 to alternately issue different indication signals at preset time intervals. As described in the first embodiment, the indication module 23 is controlled to alternately emit green light, yellow light, and red light.

In step 302, when the controller 21 detects that the atomizer 1 is connected to the battery device 2, the controller 21 determines the target output power corresponding to the indication signal currently issued by the indication module 23 according to the pre-stored correspondences between the indication signals and the output powers.

As described in the first embodiment, the electronic cigarette can work at three different output powers, such as 100 watts, 80 watts, and 50 watts. At 100 watts, the electronic cigarette has the largest amount of smoke, but it also consumes the largest power. At 80 watts, the electronic cigarette has a moderate amount of smoke and consumes a moderate power. At 50 watts, the electronic cigarette has the smallest amount of smoke, but it also consumes the smallest power and is more power efficient.

After step 301, when the user determines how much output power the electronic cigarette is required to output, the output power is referred to as the target output power. Then, according to the correspondences between the indication signals and the output powers as shown in Table 1, the user connects the atomizer 1 to the battery device 2 under the indication signal corresponding to the target output power. At the moment when the user connects the atomizer 1 to the battery device 2, the controller 21 firstly detects the connection between the atomizer 1 and the battery device 2, and then detects the indication signal currently issued by the indication module 23, and then finds out the target output power corresponding to the current indication signal from the pre-stored correspondence table between the indication signals and the output powers.

In step 303, when a suction signal is detected, the controller 21 controls the power output module 22 to output the target output power.

In the embodiment, the battery device 2 is further provided with a power adjustment circuit. After the controller 21 determines the target output power, if the electronic cigarette detects a suction signal, the controller 21 sends a power adjustment signal corresponding to the target output power to the power adjustment circuit. After receiving the power adjustment signal, the power adjustment circuit adjusts the parameters of the components of the circuit, so that the output power of the battery device 2 is adjusted to the target output power, and the electronic cigarette outputs the target output power to enter a working mode corresponding to the target output power. The suction signal detected by the electronic cigarette may be a signal sent by the user when the user presses the smoking button, or may be an airflow signal generated by an airflow sensor in the electronic cigarette when the user smokes, which is not limited in the embodiment.

As described in the first embodiment, the indication module 23 may be an indicating lamp, and under the control of the controller 21, it may emit light of three colors including green, yellow, and red, wherein each color of light corresponds to a target output power as shown in Table 1. In this case, the first embodiment has been described in detail and will not be repeated here.

Figure 4:
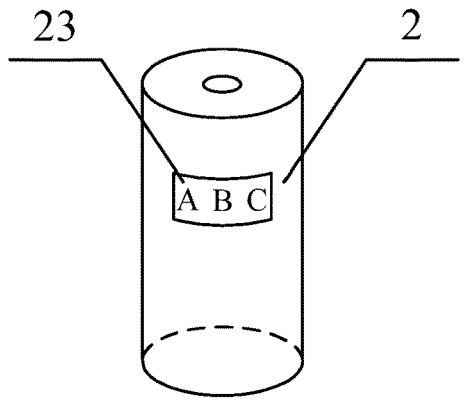
FIG. 4 is a flow chart showing a method for adjusting the power of an electronic cigarette according to an embodiment.

In one embodiment, the indication module 23 may also be three indicating lamps located at different positions on the casing 20 of the battery device 2, as shown in FIG. 4. The position A may be the position of the first indicating lamp, the position B may be the position of the second indicating lamp, and the position C may be the position of the third indicating lamp. In this case, the power adjustment process may be as follows.

TABLE 2 the correspondences between the indication signals and the output powers

| indication signals (the positions of the indicating lamps) | output powers |
|---|---|
| A | 100 W |
| B | 80 W |
| C | 50 W |

The colors emitted by the three indicating lamps may be the same or different, and the colors are not limited here.

The principle that the controller 21 controls the power output module 22 to output a certain value of power through the indication signals of the indication module 23 is the same as that of the first embodiment. The following describes the application of this kind of indication module 23 to this principle in detail.

When the controller 21 detects that the atomizer 1 is separated from the battery device 2, the controller 21 controls the indicating lamps at positions A, B, and C to emit light alternately. When the controller 21 detects that the atomizer 1 is connected to the battery device 2, the controller 21 detects the indicating lamp which is currently emitting light at the moment when the atomizer 1 is connected to the battery device 2. For example, if at this moment, the indicating lamp currently emitting light is the indicating lamp A, then when the suction signal is detected, the controller 21 controls the power output module 22 to output a power of 100 watts.

Taking the user intends the electronic cigarette to work at 100 watts as an example, the process of adjusting the working power of the electronic cigarette can be as follows: the user firstly separates the atomizer from the battery device; then, when the indicating lamp at position A emits light, the user connects the atomizer to the battery device so that the electronic cigarette will be working at 100 watts.

In another embodiment, the indication module 23 may also be three indicating lamps, and the indication signals may be represented by the number of the indicating lamps emitting light. For example, as shown in Table 3, emitting light by one indicating lamp corresponds to an output power of 50 watts, emitting light by two indicating lamps simultaneously corresponds to an output power of 80 watts, and emitting light by three indicating lamps simultaneously corresponds to an output power of 100 watts.

TABLE 3 the correspondences between the indication signals and the output powers

| indication signals (the number of the indicating lamps emitting light) | output powers |
|---|---|
| 1 | 50 W |
| 2 | 80 W |
| 3 | 100 W |

The colors emitted by the three indicating lamps may be the same or different, and the colors are not limited here.

The following describes the power adjustment principle using this kind of indication module 23.

When the controller 21 detects that the atomizer 1 is separated from the battery device 2, the controller 21 controls the indicating lamps to emit light under different numbers, that is, emitting light by one indicating lamp, emitting light by two indicating lamps simultaneously, and emitting light by three indicating lamps simultaneously in an alternate manner. When the controller 21 detects that the atomizer 1 is connected to the battery device 2, the controller 21 detects the number of the indicating lamps emitting light at the moment when the atomizer 1 is connected to the battery device 2. For example, if the number of the indicating lamps emitting light simultaneously is two, then the controller 21 controls the power output module 22 to output a power of 80 watts.

Taking the user intends the electronic cigarette to work at 80 watts as an example, the process of adjusting the working power of the electronic cigarette can be as follows: the user firstly separates the atomizer from the battery device; then, when two indicating lamps emit light simultaneously, the user connects the atomizer to the battery device so that the electronic cigarette will be working at 80 watts. Based on the above, the process for the user to adjust the working power of the electronic cigarette may be as follows: firstly, the user separates the atomizer from the battery device; then, when an indication signal corresponding to a certain power is issued by the indication module, the user connects the atomizer to the battery device so that the electronic cigarette can work at this power. Thus, the user can autonomously select the working power of the electronic cigarette.

Optionally, in order to prevent the user from accidentally separating the atomizer 1 from the battery device 2 to trigger the controller 21 to control the indication module 23 to issue the indication signals, the step 301 may be performed as such: when a shaking signal is firstly detected and then the controller 21 detects that the atomizer 1 is separated from the battery device 2, the controller 21 controls the indication module 23 to alternately issue different indication signals.

Further, the controller 21 may also control the indication module 23 to indicate the working power of the electronic cigarette by simultaneously using the number of the indicating lamps emitting light and the color of light. For example, a working power of 50 W can be indicated by turning on one lamp with red color; a working power of 100 W can be indicated by turning on three lamps with green color.

Further, the controller 21 may also control the indication module 23 to indicate the working power of the electronic cigarette by simultaneously using the positions of the indicating lamps and the color of light. For example, a working power of 50 W can be indicated by turning on the indicating lamp C with red color; a working power of 100 W can be indicated by turning on the indicating lamp A with green color.

In the embodiment, as shown in FIG. 2, the electronic cigarette is further provided with an acceleration sensor 25. The acceleration sensor 25 is used to detect the shaking signal of the electronic cigarette. The acceleration sensor 25 is electrically connected to the controller 21 and can send the shaking signal to the controller 21, and the controller 21 may perform corresponding operations based on the shaking signal. For example, when the controller 21 firstly detects the shaking signal and then detects that the atomizer 1 is separated from the battery device 2, the controller 21 then controls the indication module 23 to alternately issue different indication signals.

In this way, when the user wants to change the working power of the electronic cigarette, the user firstly shakes the electronic cigarette once or several times, and then separates the atomizer from the battery device; finally, the user connects the atomizer to the battery device under an indication signal corresponding to the target output power so that the electronic cigarette will be working at the target output power.

Optionally, when the user uses the electronic cigarette for smoking, the user can also check the current output power of the electronic cigarette. Specifically, when the atomizer 1 and the battery device 2 are in a connected state, if a shaking signal is detected, the controller 21 determines the current output power of the power output module 22, and determines a second indication signal corresponding to the current output power of the power output module 22 according to the correspondences between the indication signals and the output powers in the above step 302; then the controller controls the indication module 23 to issue the second indication signal.

As described above, the acceleration sensor 25 sends the detected shaking signal to the controller 21, and the controller 21 performs corresponding operations based on the shaking signal.

In the embodiment, the process is the reverse of step 302. When the user uses the electronic cigarette to smoke, and the user wants to know the current output power of the electronic cigarette, the user can shake the electronic cigarette once. After the acceleration sensor detects the shaking signal, it will transmit the shaking signal to the controller 21. Firstly, the controller 21 detects the current output power of the power output module 22; then, the controller 21 finds out the second indication signal corresponding to the current output power from the pre-stored correspondence table between the indication signals and the output powers. After the controller 21 determines the second indication signal, the controller 21 sends a circuit adjustment signal corresponding to the second indication signal to an adjustment circuit of the indication module 23. After the adjustment circuit of the indication module 23 receives the circuit adjustment signal, the parameters of the adjustment circuit are adjusted to cause the indication module 23 to issue the second indication signal. For example, if the current output power is 80 W, then the second indication signal is a yellow light emitted by the indicating lamp. In this way, the user can conveniently check the current output power of the electronic cigarette.

Figure 5:
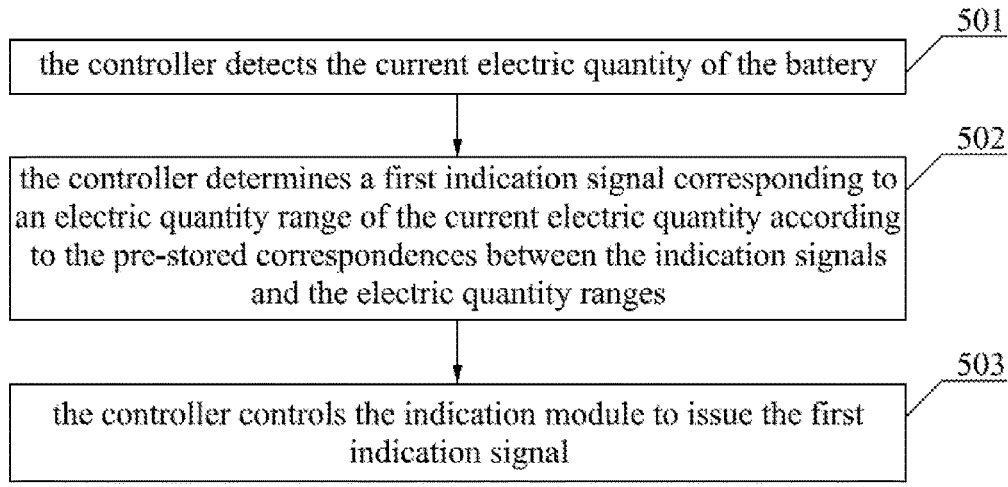
FIG. 5 is a flow chart showing a method for adjusting the power of an electronic cigarette according to an embodiment.

Optionally, the indication signals of the indication module 23 may be used not only represent the output power of the electronic cigarette, but also the electric quantity of the electronic cigarette. Correspondingly, the battery device 2 further includes a battery 24. The battery 24 is electrically connected to the controller 21, the indication module 23 and the power output module 22, respectively, for supplying electricity to the above modules. As shown in FIG. 5, the method may further include the following steps:

In step 501, the controller 21 detects the current electric quantity of the battery 24.

In the embodiment, when the user normally smokes using the electronic cigarette, that is, the atomizer 1 and the battery device 2 are in a connected state, the controller 21 detects the electric quantity of the battery 24 when reaching a cycle for detecting the electric quantity, or the electric quantity of the battery 24 can be monitored in real time.

In step 502, the controller 21 determines a first indication signal corresponding to an electric quantity range of the current electric quantity according to the pre-stored correspondences between the indication signals and the electric quantity ranges.

The indication signals issued by the indication module 23 may be any signal that can attract the user's attention. For example, as mentioned above, the indication signal may be a signal of different colors of light, a signal of turning on lamps at different positions, or a signal of turning on lamps at different numbers, etc. In the following, turning on lamps at different numbers is taken as an example for detailed description, that is, the indication signal is a signal of emitting light by one indicating lamp, by two indicating lamps simultaneously, or by three indicating lamps simultaneously.

The electric quantity of the battery 24 can be divided into multiple electric quantity ranges, for example, divided into N electric quantity ranges, where N is an integer greater than or equal to 2, wherein the minimum electric quantity in the (i)th electric quantity range is greater than the maximum electric quantity in the (i−1)th electric quantity range, i is an integer greater than 1. For the convenience of description, for example, the electric quantity of the battery 24 can be divided into three ranges, i.e., a high electric quantity range (also referred to as the first electric quantity range), a middle electric quantity range (also referred to as the second electric quantity range), and a low electric quantity range (also referred to as the third electric quantity range). For example, in the high electric quantity range, the electric quantity may be in the range greater than or equal to 80% and less than or equal to 100%; in the middle electric quantity range, the electric quantity may be in the range greater than or equal to 30% and less than 80%; and in the low electric quantity range, the electric quantity may be in the range greater than 0% and less than 30%. The correspondences between the indication signals and the electric quantity ranges may be shown in Table 4.

In the embodiment, after the controller 21 determines the current electric quantity of the battery 24, the controller 21 finds out the number of the indicating lamps required to be turned on corresponding to the current electric quantity from the pre-stored correspondence table between the indication signals and the electric quantity ranges as shown in Table 4. That is, the controller 21 determines the first indication signal corresponding to an electric quantity range of the current electric quantity.

TABLE 4 the correspondences between the indication signals
and the electric quantity ranges of the battery

| indication signals (the number of the indicating lamps emitting light) | electric quantity ranges of the current electric quantity of the battery |
|---|---|
| 1 | low electric quantity range [0%-30%] |
| 2 | middle electric quantity range [30%-80%] |
| 3 | high electric quantity range [80%-100%] |

Optionally, in addition to indicating the electric quantity of the battery through the number of the indicating lamps, the electric quantity of the battery can also be indicated by different colors of light, for example, the low electric quantity range is indicated by a red light, the middle electric quantity range is indicated by a yellow light, and the high electric quantity range is indicated by a green light.

In step 503, the controller 21 controls the indication module 23 to issue the first indication signal.

In the embodiment, after the controller 21 determines the first indication signal, it sends a circuit adjustment signal corresponding to the first indication signal to the adjustment circuit of the indication module 23. After the adjustment circuit of the indication module 23 receives the circuit adjustment signal, the parameters of the adjustment circuit are adjusted to cause the indication module 23 to issue the first indication signal. For example, if the controller 21 detects that the current electric quantity is 75% and determines that the current electric quantity is within the middle electric quantity range, then the controller 21 controls two indicating lamps to emit light simultaneously.

In this way, when the user uses the electronic cigarette, the user can know the electric quantity range of the battery 24, and when the electric quantity range is found to be relatively low, the user can charge the battery 24 in time. Further, the controller 21 controls the indication module 23 to issue the first indication signal, to remind the user to change the output power of the electronic cigarette in time to prevent the electronic cigarette from working at a high output power, causing the electronic cigarette to consume excessive power. Thus, the use time of the electronic cigarette can be prolonged.

Figure 6:
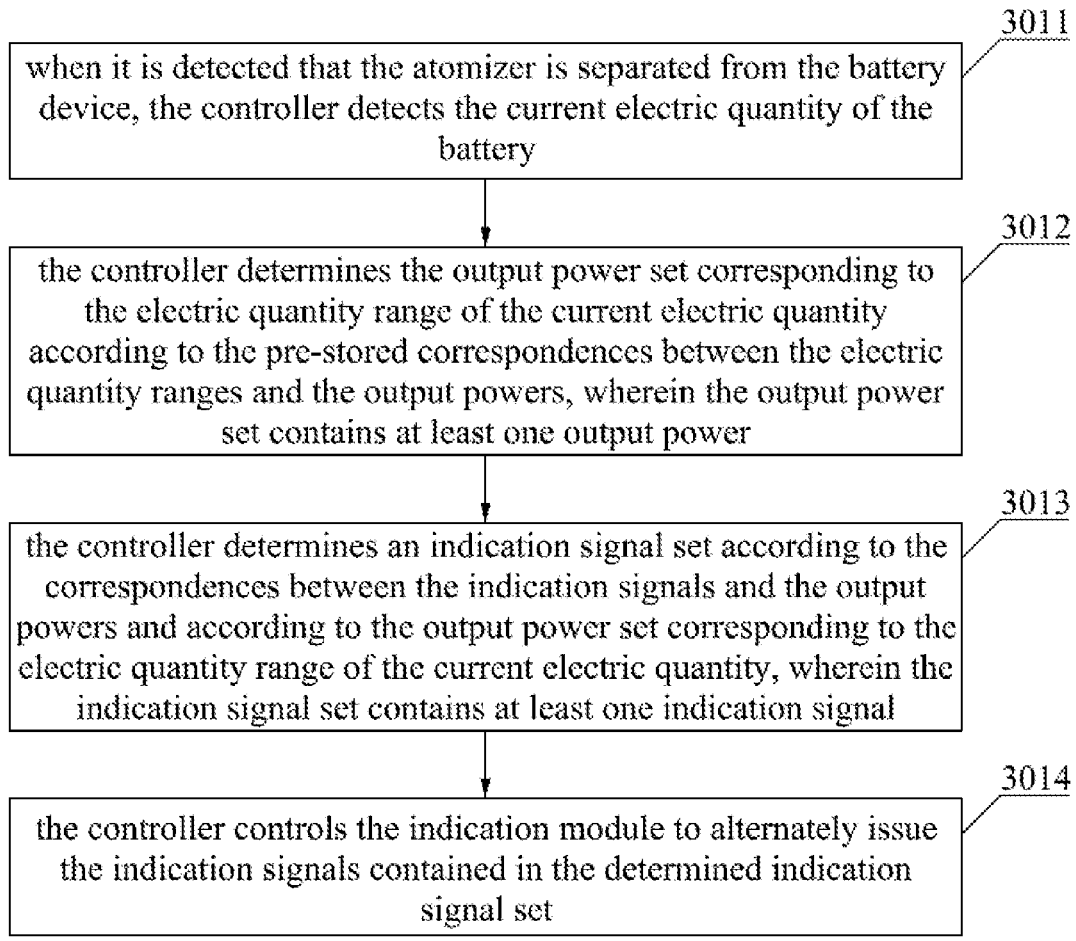
FIG. 6 is a flow chart showing a method for adjusting the power of an electronic cigarette according to an embodiment.

Optionally, the controller 21 may control the power output module 22 to output different powers based on the current electric quantity of the battery 24. As shown in FIG. 6, the corresponding process in step 301 may further include the following steps:

In step 3011, when the controller 21 detects that the atomizer 1 is separated from the battery device 2, the controller 21 detects the current electric quantity of the battery 24.

In step 3012, the controller 21 determines the output power set corresponding to the electric quantity range of the current electric quantity according to the pre-stored correspondences between the electric quantity ranges and the output powers, wherein the output power set contains at least one output power.

For example, in the embodiment, the correspondences between the electric quantity ranges and the output power sets are pre-stored in the controller 21. In the correspondences, the higher the electric quantity, the more the output power contained in the output power set corresponding to the electric quantity range. In the (i)th output power set corresponding to the (i)th electric quantity range, there is at least one output power whose value is greater than the maximum output power in the (i−1)th output power set corresponding to the (i−1)th electric quantity range. As shown in Table 5, when the electric quantity of the battery 24 is in a low electric quantity range (0%-30%), the controller 21 controls the power output module 22 to output only 50 watts of output power, and at this time, the output power set is {50 watts} (also referred to as the first output power set); when the electric quantity of the battery 24 is in a middle electric quantity range (30%-80%), the controller 21 controls the power output module 22 to output 50 Watts and 80 watts of output power, and at this time, the output power set is {50 watts, 80 watts} (also referred to as the second output power set); when the electric quantity of the battery 24 is in a high electric quantity range (80%-100%), the controller 21 controls the power output module 22 to output 50 watts, 80 watts, and 100 watts of output power, and at this time, the output power set is {50 watts, 80 watts, 100 watts} (also referred to as the third output power set). In the correspondences, it can be seen that there is one output power (100 watts) in the third output power set, which is greater than the maximum output power (80 watts) in the second output power set.

TABLE 5 the correspondences between the electric
quantity ranges and the output power sets

| electric quantity ranges | output power sets |
|---|---|
| low electric quantity range [0%-30%] | {50 watts} |
| middle electric quantity range [30%-80%] | {50 watts, 80 watts} |
| high electric quantity range [80%-100%] | {50 watts, 80 watts, 100 watts} |

In step 3013, the controller 21 determines an indication signal set according to the correspondences between the indication signals and the output powers and according to the output power set corresponding to the electric quantity range of the current electric quantity, wherein the indication signal set contains at least one indication signal.

In the embodiment, after the controller 21 determines the output power(s) that can be output according to Table 5, the controller 21 then determines the corresponding indication signals according to the correspondences between the indication signals and the output powers. For example, if the current electric quantity is 75%, then the power output module 22 can be controlled to output 50 watts and 80 watts of output power. Based on the correspondences between the indication signals and the output powers as shown in Table 1 or Table 2 or Table 3, by taking Table 1 as an example, it is determined that the indication module 23 should emit red light and yellow light, and therefore, the indication signal set is {red light, yellow light}.

In step 3014, the controller 21 controls the indication module 23 to alternately issue the indication signals contained in the determined indication signal set.

In the embodiment, after the controller 21 determines the corresponding indication signals, the indication module 23 is controlled to issue the determined indication signals. For example, if it is determined that the indication module 23 should emit red light and yellow light, then the controller 21 controls the indication module 23 to alternately emit red light and yellow light.

In this way, the electronic cigarette can be prevented from switching to work with a high output power when the electric quantity is insufficient, thereby protecting the battery 24 and extending the service life of the electronic cigarette.

Figure 7:
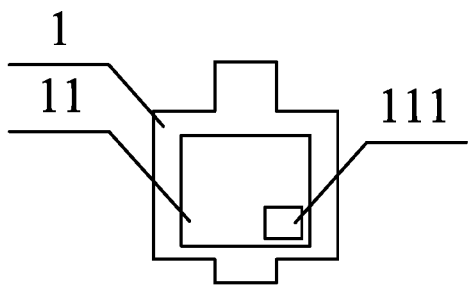
FIG. 7 is a schematic structural diagram of an atomizer according to an embodiment.

Optionally, in the case that there is little e-liquid in the atomizer 1, the user needs to replace the atomizer 1 or take off the atomizer 1 and refill the e-liquid. In order to avoid the output power from changing if the user separates the atomizer 1 from the battery device 2 and reinstalls them under this situation, when the user separates the atomizer 1 from the battery device 2, the battery device 2 does not enter the output power switching state, that is, the indication module 23 does not issue an indication signal. The corresponding change in the structure of the electronic cigarette may be shown in FIG. 7, a humidity sensor 111 for detecting e-liquid is provided in a liquid storage chamber 11 of the atomizer 1. When the atomizer 1 and the battery device 2 are in a connected state, the humidity sensor 111 is electrically connected to the controller 21. The corresponding change before step 301 may be: when the atomizer 1 and the battery device 2 are in the connected state, the humidity sensor 111 periodically sends a detected humidity value to the controller 21.

The liquid storage chamber 11 is used for containing e-liquid, and the humidity sensor 111 is used to detect the humidity value in the liquid storage chamber 11. When the atomizer 1 and the battery device 2 are in the connected state, the circuit between the atomizer 1 and the battery device 2 is conducted, and the humidity sensor 111 sends the detected humidity value to the controller 21.

In the embodiment, when the user unscrews the atomizer 1 from the battery device 2, the controller 21 detects that the atomizer 1 is separated from the battery device 2. First, the controller 21 determines the relationship between the humidity value received in the last period before the atomizer 1 is separated from the battery device 2 and a preset humidity threshold. If the humidity value is greater than the preset humidity threshold, then the controller 21 controls the indication module 23 to alternately issue different indication signals. However, if the humidity value is less than or equal to the preset humidity threshold, the controller 21 does not send related instructions to the indication module 23.

In the embodiment, when the user intends to adjust the output power of the electronic cigarette, firstly, the user separates the atomizer from the battery device; then, when an indication signal corresponding to a certain power is issued, the user connects the atomizer to the battery device, so that the electronic cigarette will be working at this power. Therefore, the electronic cigarette can realize switching of output power through the separation and connection between the atomizer and the battery device, without the need to set a button. Thus, on the basis of meeting the miniaturization requirement, the electronic cigarette can output a variety of powers, and the user can select the output power of the electronic cigarette autonomously.

Third Embodiment

A third embodiment of the present disclosure provides a device for adjusting the power of an electronic cigarette. The device for adjusting the power of the electronic cigarette includes: a memory and a processor; the memory stores therein at least one instruction; and the processor, by loading and executing the at least one instruction, implements the method for adjusting the power of the electronic cigarette.

Fourth Embodiment

A fourth embodiment of the present disclosure provides a computer-readable storage medium, wherein the computer-readable storage medium stores therein one or more instructions. When the one or more instructions are executed by a processor in an electronic cigarette, the method for adjusting the power of the electronic cigarette is implemented.

Those skilled in the art will readily think of other embodiments of this disclosure after considering the specification in this disclosure. This application is intended to cover any variations, usages, or adaptations of this disclosure. These variations, usages, or adaptations conform to the general principle of this disclosure and include common general knowledge or conventional technical solutions in the technical field not disclosed in this disclosure. It is intended that the specification and the embodiments be considered as exemplary only, with a true scope and spirit of this disclosure being indicated by the following claims.

It should be understood that this disclosure is not limited to the precise structure that has been described above and illustrated in the drawings, and various modifications and changes can be made without departing from the scope thereof. The scope of this disclosure is limited only by the following claims.

What is claimed is:

1. An electronic cigarette, comprising an atomizer and a battery device, the battery device comprising a casing, and a controller and a power output module disposed inside the casing, wherein:
    the atomizer is detachably connected to the battery device;
    the casing is provided with an indication module;
    the controller is electrically connected to the indication module and the power output module, respectively;
    when the controller detects that the atomizer is separated from the battery device, the controller is configured to control the indication module to alternately issue different indication signals;
    when the controller detects that the atomizer is connected to the battery device, the controller is configured to determine a target output power corresponding to an indication signal currently issued by the indication module according to pre-stored correspondences between indication signals and output powers, and control the power output module to output the target output power when a suction signal is detected.

2. The electronic cigarette according to claim 1, wherein the battery device further comprises a battery;
    the battery is electrically connected to the controller, the indication module and the power output module, respectively;
    the controller is further configured to:
        detect current electric quantity of the battery;
        determine a first indication signal corresponding to an electric quantity range of the current electric quantity of the battery according to pre-stored correspondences between indication signals and electric quantity ranges of the battery; and
        control the indication module to issue the first indication signal.

3. The electronic cigarette according to claim 1, wherein the battery device further comprises a battery;

the battery is electrically connected to the controller, the indication module and the power output module, respectively;

the controller is further configured to:
- detect current electric quantity of the battery when the atomizer is separated from the battery device;
- determine an output power set corresponding to an electric quantity range of the current electric quantity according to pre-stored correspondences between electric quantity ranges and output powers;
- determine an indication signal set according to correspondences between indication signals and output powers and according to the output power set corresponding to the electric quantity range of the current electric quantity; and
- control the indication module to alternately issue indication signals contained in the determined indication signal set, wherein the output power set contains at least one output power, the determined indication signal set contains at least one indication signal.

4. The electronic cigarette according to claim 1, wherein a humidity sensor for detecting e-liquid is provided in a liquid storage chamber of the atomizer;

when the atomizer and the battery device are in a connected state, the humidity sensor is electrically connected to the controller;

the humidity sensor is configured to periodically send a humidity value to the controller when the atomizer and the battery device are in a connected state;

the controller is further configured to:
- determine the relationship between the humidity value received in a last period before the atomizer is separated from the battery device and a preset humidity threshold when the controller detects that the atomizer is separated from the battery device; and
- control the indication module to alternately issue different indication signals if the humidity value is greater than the preset humidity threshold.

5. The electronic cigarette according to claim 1, wherein when a shaking signal is firstly detected and then the controller detects that the atomizer is separated from the battery device, the controller is configured to control the indication module to alternately issue different indication signals.

6. The electronic cigarette according to claim 1, wherein when the atomizer and the battery device are in a connected state, if a shaking signal is detected, the controller is configured to:
- determine current output power of the power output module;
- determine a second indication signal corresponding to the current output power of the power output module according to correspondences between indication signals and output powers; and
- control the indication module to issue the second indication signal.

7. A method being applied to an electronic cigarette for adjusting power of the electronic cigarette, the electronic cigarette comprising an atomizer and a battery device, the battery device comprising a casing, and a controller and a power output module disposed inside the casing, the atomizer being detachably connected to the battery device, the casing being provided with an indication module, the controller being electrically connected to the indication module and the power output module, respectively, wherein the method comprises:

when the controller detects that the atomizer is separated from the battery device, the controller controls the indication module to alternately issue different indication signals;

when the controller detects that the atomizer is connected to the battery device, the controller determines a target output power corresponding to an indication signal currently issued by the indication module according to pre-stored correspondences between indication signals and output powers;

when a suction signal is detected, the controller controls the power output module to output the target output power.

8. The method according to claim 7, wherein the battery device further comprises a battery, and the battery is electrically connected to the controller, the indication module and the power output module, respectively;

the method further comprises:
- the controller detects current electric quantity of the battery;
- the controller determines a first indication signal corresponding to an electric quantity range of the current electric quantity of the battery according to pre-stored correspondences between indication signals and electric quantity ranges of the battery; and
- the controller controls the indication module to issue the first indication signal.

9. The method according to claim 7, wherein the battery device further comprises a battery, and the battery is electrically connected to the controller, the indication module and the power output module, respectively;

the step that when the controller detects that the atomizer is separated from the battery device, the controller controls the indication module to alternately issue different indication signals, comprises:
- the controller detects current electric quantity of the battery when the atomizer is separated from the battery device;
- the controller determines an output power set corresponding to an electric quantity range of the current electric quantity according to pre-stored correspondences between electric quantity ranges and output powers, wherein the output power set contains at least one output power;
- the controller determines an indication signal set according to correspondences between indication signals and output powers and according to the output power set corresponding to the electric quantity range of the current electric quantity, wherein the indication signal set contains at least one indication signal; and
- the controller controls the indication module to alternately issue indication signals contained in the determined indication signal set.

10. The method according to claim 7, wherein a humidity sensor for detecting e-liquid is provided in a liquid storage chamber of the atomizer; when the atomizer and the battery device are in a connected state, the humidity sensor is electrically connected to the controller and periodically sends a humidity value to the controller;

the step that when the controller detects that the atomizer is separated from the battery device, the controller controls the indication module to alternately issue different indication signals, comprises:
- the controller determines the relationship between the humidity value received in a last period before the atomizer is separated from the battery device and a preset humidity threshold when the controller detects that the atomizer is separated from the battery device; and the controller controls the indication module to alternately issue different indication signals if the humidity value is greater than the preset humidity threshold.

11. The method according to claim 7, wherein the step that when the controller detects that the atomizer is separated from the battery device, the controller controls the indication module to alternately issue different indication signals, comprises:

when a shaking signal is firstly detected and then the controller detects that the atomizer is separated from the battery device, the controller controls the indication module to alternately issue different indication signals.

12. The method according to claim 7, wherein the method further comprises:

when the atomizer and the battery device are in a connected state, if a shaking signal is detected, the controller determines current output power of the power output module, determines a second indication signal corresponding to the current output power of the power output module according to correspondences between indication signals and output powers, and controls the indication module to issue the second indication signal.

13. A device for adjusting power of an electronic cigarette, comprising:

a memory and a processor;

wherein the memory stores therein at least one instruction; and the processor, by loading and executing the at least one instruction, implements the method for adjusting power of the electronic cigarette according to claim 7.

14. A computer-readable storage medium, wherein the computer-readable storage medium stores therein one or more instructions, when the one or more instructions are executed by a processor in an electronic cigarette, the method for adjusting power of the electronic cigarette according to claim 7 is implemented.

* * * * *